(12) United States Patent
Watanabe et al.

(10) Patent No.: US 7,670,425 B2
(45) Date of Patent: Mar. 2, 2010

(54) ULTRA HIGH STRENGTH FIBER-REINFORCED CEMENT COMPOSITION, ULTRA HIGH STRENGTH FIBER-REINFORCED MORTAR OR CONCRETE AND ULTRA HIGH STRENGTH CEMENT ADDITIVES

(75) Inventors: Yoshiharu Watanabe, Itoigawa (JP); Masanobu Ashida, Itoigawa (JP); Kazuhiro Aizawa, Itoigawa (JP); Kazunori Takada, Tokyo (JP); Yoshihiro Hishiki, Tokyo (JP); Toshio Ohno, Tokyo (JP); Toshimichi Ichinomiya, Tokyo (JP); Gorou Sakai, Tokyo (JP); Noriaki Matsubara, Tokyo (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 137 days.

(21) Appl. No.: 11/918,626

(22) PCT Filed: Mar. 30, 2006

(86) PCT No.: PCT/JP2006/307263

§ 371 (c)(1),
(2), (4) Date: Oct. 16, 2007

(87) PCT Pub. No.: WO2006/115004

PCT Pub. Date: Nov. 2, 2006

(65) Prior Publication Data

US 2009/0071378 A1    Mar. 19, 2009

(30) Foreign Application Priority Data

Apr. 18, 2005  (JP) .............................. 2005-120127

(51) Int. Cl.
*C04B 14/00* (2006.01)
*C04B 18/06* (2006.01)
(52) U.S. Cl. .................................... 106/705
(58) Field of Classification Search ............... 106/705
See application file for complete search history.

(56) References Cited

U.S. PATENT DOCUMENTS

| 4,640,715 | A | * | 2/1987 | Heitzmann et al. | .......... 106/706 |
| 4,652,433 | A | | 3/1987 | Ashworth et al. | |
| 6,346,146 | B1 | * | 2/2002 | Duselis et al. | .............. 106/713 |
| 2004/0050302 | A1 | * | 3/2004 | Casanova et al. | ........... 106/640 |

FOREIGN PATENT DOCUMENTS

| JP | H11-147747 | | 6/1999 |
| JP | 2001019527 | A * | 1/2001 |
| JP | 2005-022931 | | 1/2005 |

* cited by examiner

*Primary Examiner*—Melvin C Mayes
*Assistant Examiner*—Michael Forrest
(74) *Attorney, Agent, or Firm*—Manabu Kanesaka

(57) ABSTRACT

An ultra high strength fiber-reinforced cement composition includes cement, silica fume, coal gasification fly ash, insoluble anhydrous gypsum, and metal fiber having a length between 5 and 30 mm and a diameter of between 0.1 and 1 mm. The coal gasification fly ash is spherical fine particles having a maximum particle size between 5 and 10 μm. Mass ratio of the silica fume: the coal gasification fly ash is 95 through 50 portions: 5 through 50 portions.

9 Claims, No Drawings

ULTRA HIGH STRENGTH FIBER-REINFORCED CEMENT COMPOSITION, ULTRA HIGH STRENGTH FIBER-REINFORCED MORTAR OR CONCRETE AND ULTRA HIGH STRENGTH CEMENT ADDITIVES

TECHNICAL FIELD

This invention relates to an ultra high strength fiber-reinforced cement composition, ultra high strength fiber-reinforced mortar or concrete and ultra high strength cement additives. More particularly, the present invention relates to a ultra high strength fiber-reinforced cement composition containing silica fume and coal gasification fly ash mixed to a specific ratio, gypsum and metal fiber, ultra high strength fiber-reinforced mortar or concrete containing such a cement composition and fine aggregate and an ultra high strength cement additives to be used for such mortar or concrete.

BACKGROUND ART

Mortar and concrete have a problem that they basically show a low bending strength if compared with their high compressive strength. The bending strength is not remarkably improved by raising the compressive strength. Known techniques for improving the bending strength of mortar or that of concrete include those of introducing prestress by the PC steel used therein, those of introducing chemical prestress by means of an expansive cement, those of reinforcement by means of metal fiber and those of producing a composite structure by filling steel pipes with high strength mortar or concrete.

A cement composition reinforced by metal fiber to realize an ultra high strength and a high bending strength and hardened cement products made by the cement composition have already been proposed. According to the proposal, a cement type set product showing a compressive strength of 1,500 kgf/cm$^2$ (147 N/mm$^2$) and a bending strength of 150 kgf/cm$^2$ (14.7 N/mm$^2$) is obtained by means of a cement composition prepared by using cement, a pozzolanic substance with an average particle size smaller than 1.5 μm, quartzose powder with an average particle size between 1.5 and 20 μm and aggregate and metal fiber (see Patent Document 1).

Patent Document 1: JP-A-11-130508

Coal gasification fly ash is a byproduct that is discharged when generating power by means of gasified coal and composed of spherical particles having an average size smaller than the fly ash that is discharged as byproduct of ordinary pulverized coal-fired power generation. Additionally, coal gasification fly ash has a smooth surface on the spherical particles thereof so that it provides an excellent ball bearing effect if compared with ordinary fly ash. Thus, it has been proposed to utilize coal gasification fly ash for high strength mortar or concrete with a high fluidity in low water-binder ratio (see Patent Document 2).

Patent Document 2: JP-A-2001-19527

Furthermore, gypsum is being popularly used for high strength additives with or without steam curing and it has been proposed to obtain an additives showing a higher strength and a higher durability by combining gypsum and silica fume (see Patent Document 3).

Patent Document 3: JP 2581803

However, the Patent Document 1 describes that pozzolanic fine powder is silica fume or fly ash. Since silica fume has an average particle size of 0.1 μm, it can be used for high strength additives without any further processing. On the other hand, fly ash discharged as byproduct from pulverized coal-fired power plants has a maximum particle size of about 100 μm and hence cannot be used for high strength additives without classifying or crushing/classifying. While fly ash discharged as byproduct from coal gasification power plants is not specifically described, such fly ash also requires classifying because it has a maximum particle size of about 5 to 10 μm. Thus, a problem of requiring an additional classifying or crushing/classifying step remains when such fly ash is to be utilized industrially. Furthermore, a similar problem of requiring crushing and adjustment remains for quartzose powder having an average particle size between 1.5 and 20 μm. Furthermore, nothing is described about specific effects and advantages when silica fume and not-classified coal gasification fly ash are combined to show a specific ratio for use.

The pozzolanic activity of coal gasification fly ash described in the Patent Document 2 is significantly lower than silica fume and there remains a problem that steam curing does not provide any remarkable effect for raising the compressive strength and it cannot be expected to improve the bending strength. Additionally, the Document neither describes nor suggests anything about effects and advantages when silica fume and coal gasification fly ash are combined to show a specific ratio for use.

According to the proposal of the Patent Document 3, it is possible to realize a high strength with ease by combining gypsum and a pozzolanic substance (silica fume, fly ash and/or the like) but the ratio of bending strength relative to compressive strength is not increased. In other words, there remains a problem that remarkable improvement of bending strength is not expectable. Additionally, the document does not describe anything about coal gasification fly ash. Nor describes it about effects and advantages when silica fume and coal gasification fly ash are combined to show a specific ratio for use.

DISCLOSURE OF THE INVENTION

Problem to be Solved by the Invention

Therefore, the problem to be solved by the present invention is to provide highly general purpose ultra high strength fiber-reinforced mortar or concrete that shows a higher fluidity (workability) at the fresh state, a higher bending strength with a less content of metal fiber by enhancing both the absolute value of the compressive strength of mortar -matrix excluding metal fiber and the ratio of the bending strength relative to the compressive strength simultaneously at the hardened state, and acceptability of fine aggregate being used in ordinary ready-mixed concrete. The problem should be solved by a synergetic effect of using a cement additives prepared by combining silica fume, coal gasification fly ash and gypsum, which are popularly known, within a specific range.

Means for Solving the Problem

According to the present invention, the above problem is solved by the means as described below.

(1) An ultra high strength fiber-reinforced cement composition, characterized in that the composition contains cement, silica fume, coal gasification fly ash, gypsum and metal fiber and that the mass ratio of silica fume: coal gasification fly ash is 95 through 50 portions:5 through 50 portions.

(2) The ultra high strength fiber-reinforced cement composition as defined in (1) above, characterized in that the composition contains silica fume and coal gasification fly ash by a total of between 5 and 40 mass portions and gypsum by between 0.5 and 8 mass portions relative to 100 mass portions of cement.

(3) Ultra high strength fiber-reinforced mortar or concrete, characterized in that the mortar or concrete contains cement, silica fume, coal gasification fly ash, gypsum, fine aggregate and metal fiber and that the mass ratio of silica fume: coal gasification fly ash is 95 through 50 portions:5 through 50 portions.

(4) The ultra high strength fiber-reinforced mortar or concrete as defined in (3) above, characterized in that the mortar or concrete contains silica fume and coal gasification fly ash by a total of between 5 and 40 mass portions and gypsum by between 0.5 and 8 mass portions relative to 100 mass portions of cement.

(5) The ultra high strength fiber-reinforced mortar or concrete as defined in (3) or (4) above, characterized in that the metal fiber has a length of between 5 and 30 mm.

(6) The ultra high strength fiber-reinforced mortar or concrete as defined in any one of (3) through (5) above, characterized in that the mortar or concrete contains fine aggregate by between 50 and 200 mass portions, mixing water and a high performance water-reducing agent by a total of between 15 and 25 mass portions relative to a total of 100 mass portions of cement, silica fume, coal gasification fly ash and gypsum and contains metal fiber by between 0.5 and 3 volume % per 1 $m^3$ of mortar or concrete.

(7) The ultra high strength fiber-reinforced mortar or concrete as defined in any one of (3) through (6) above, characterized in that the mortar or concrete has a compressive strength not less than 150 $N/mm^2$ and a bending strength not less than 20 $N/mm^2$.

(8) An ultra high strength cement additives, characterized in that the additives contains silica fume, coal gasification fly ash and gypsum as principal ingredients and the mass ratio of silica fume: coal gasification fly ash is 95 through 50 portions:5 through 50 portions.

(9) The ultra high strength cement additives as defined in (8) above, characterized in that the additives uses silica fume and coal gasification fly ash by a ratio of a total of between 5 and 40 mass portions and gypsum by a ratio of between 0.5 and 8 mass portions relative to 100 mass portions of cement.

While the expression of portions and that of % for composition ratio and addition ratio as used herein refer to mass portions and mass %, they refer to volume portions only for metal fiber due to the custom of the industry.

Advantages of the Invention

Thus, according to the present invention, it is possible to obtain (a) an ultra high strength fiber-reinforced cement composition and ultra high strength fiber-reinforced mortar or concrete that show an improved fluidity to provide a good workability and (b) an ultra high strength fiber-reinforced mortar or concrete member (a highly durable hardened cement product showing an ultrahigh compressive strength, a high bending strength and an ultrahigh density) showing a compressive strength not less than 150 $N/mm^2$ and a bending strength not less than 20 $N/mm^2$ as well as a high ratio of bending strength relative to compressive strength.

BEST MODE FOR CARRYING OUT THE INVENTION

Now, the present invention will be described in greater detail below.

Cements that can be used for a ultra high strength fiber-reinforced cement composition according to the invention include ordinary, high early strength, moderate heat, low heat, sulfate resistant, white and other various Portland cements, mixed cements obtained by mixing blast furnace slag and ordinary fly ash with Portland cement, eco cement, ultrahigh early strength cement and quick hardening cement. Cements prepared by mixing a plurality of such cements to any arbitrarily selected ratio can also be used for the purpose of the present invention. However, the use of ordinary Portland cement, high early strength Portland cement and blast furnace slag cement that are suitable for forming an ettringite is preferable.

Silica fume to be used for an ultra high strength fiber-reinforced cement composition according to the present invention is a byproduct of a process of manufacturing metal silicon and silicon alloys such as ferrosilicon in an electric furnace that is spherical ultra-fine particles whose main ingredient is amorphous $SiO_2$. Silica fume can raise the compressive strength of a hardened cement product. However, the ratio of the bending strength relative to the compressive strength of a hardened cement product can fall if compared with a hardened cement product containing no silica fume. Since silica fume takes the form of spherical ultra-fine particles, it can provide fresh cement mixtures with a good fluidity if used with high performance water-reducing agent.

Coal gasification fly ash (to be referred to as CGFA hereinafter) to be used for an ultra high strength fiber-reinforced cement composition according to the present invention is discharged as byproduct from coal gasification power plants. It is normally discarded from the flue of the boiler with combustion gas and collected by means of a dust collector. It is spherical fine particles having a maximum particle size of between 5 and 10 μm. It differs from ordinary coal-fired fly ash in terms of particle size and particle surface properties and is characterized by showing a high $SiO_2$ content ratio.

Since CGFA is spherical particles like silica fume, it provides an effect of raising the fluidity when combined with a high performance water-reducing agent for use. However, the pozzolanic activity of CGFA is lower than silica fume and hence the strength improving effect of CGFA is insufficient.

According to the present invention, 95 through 50 mass portions of silica fume and 5 through 50 mass portions of CGFA are combined with each other. As a result of combining them to the specific ratio, it becomes possible to improve both the fluidity of the fresh cement mixtures and the bending strength of the hardened cement product due to a synergetic effect.

The effect of improving the fluidity and the bending strength is insufficient when CGFA is less than 5 mass portions and the compressive strength falls when CGFA exceeds 50 mass portions. As for the mixing ratio of CGFA relative to silica fume, both the fluidity and the bending strength gradually rise as the mixing ratio of CGFA increases, although the effect of improving them falls when the mixing ratio of CGFA relative to silica fume exceeds a peak value. Therefore, there is a preferable range for the mixing ratio of silica fume and CGFA and, for the purpose of the present invention, the preferable range is 90 through 60 mass portions of silica fume and 10 through 40 mass portions of CGFA.

Silica fume and CGFA that show a specific mixing ratio are added by a total of between 5 and 40 mass portions to 100 mass portions of cement. The effect of improving the fluidity and both the compressive strength and the bending strength is insufficient when they are less than 5 mass portions, whereas the fluidity falls and the effect of improving the strengths cannot be expected relative to the high ratio of addition when they exceed 40 mass portions so that it is not preferable to add them out of the above defined range from the viewpoint of both performance and economy. For the purpose of the present invention, a preferable range is between 7 and 30 mass portions.

While any of various forms of gypsum such as gypsum dihydrate, gypsum hemihydrate, soluble anhydrous gypsum (type III) and insoluble anhydrous gypsum (type II) may be used for the purpose of the present invention, anhydrous gypsum, gypsum hemihydrate and gypsum dihydrate are preferable. Gypsum temporarily suppresses the hydration of calcium aluminate and raises the fluidity in the initial states of hydration and subsequently produces needle-like crystal of ettringite by way of a hydrating reaction. Ettringite fills cavities in a hardened cement product and encourages densification/solidification to make it possible to raise the strength of the hardened cement product.

Gypsum is added by between 0.5 and 8 mass portions in terms of anhydrate to 100 mass portions of cement. The effect of improving the fluidity and both the compressive strength and the bending strength is insufficient when gypsum is less than 5 mass portions, whereas the effect of improving the fluidity and strengths cannot be expected relative to the high ratio of addition when it exceeds 8 mass portions. For the purpose of the present invention, a preferable range is between 1 and 5 mass portions.

River sand and crushed sand that are normally employed in ready-mixed concrete plants are easily available and hence preferable as fine aggregate to be used for ultra high strength fiber-reinforced mortar or concrete according to the present invention, although there are no limitations to the type of sand to be used for the purpose of the present invention. Other types of sand that can suitably be used to achieve a higher degree of strength for the purpose of the present invention include highly hard calcined bauxite, ironstone, quartz schist and other fine aggregates. The maximum aggregate size may be limited depending on the purpose and application, although it is not normally necessary to specifically arrange the particle size by limiting the maximum aggregate size. Normally, it is sufficient to arrange the particle size so as to conform to the standard specifications defined by Japan Society of Civil Engineers and Architectural Institute of Japan. Fine aggregate is added to a mixture of cement, silica fume, CGFA and gypsum (to be referred to collectively simply as binder hereinafter) by between 50 and 200 mass portions relative to 100 mass portions of the latter. The obtained hardened cement product may show fragile properties and reduce the bending strength when fine aggregate is less than 50 mass portions, whereas it is difficult to achieve a compressive strength not less than 150 N/mm$^2$ if the high performance water-reducing agent is maximally exploited when fine aggregate is more than 200 mass portions. For the purpose of the present invention, a preferable range is between 60 and 150 mass portions.

It is also possible to add coarse aggregate to any arbitrarily selected ratio. Like fine aggregate, there are no particular limitations to the quality of coarse aggregate and it is possible to use coarse aggregate that is normally employed in ready-mixed concrete plants.

When manufacturing ultra high strength fiber-reinforced mortar or concrete according to the present invention, 100 mass portions of the binder and a total of between 15 and 25 mass portions of mixing water and the high performance water-reducing agent (to be referred to simply as water ratio hereinafter) are mixed. The high performance water-reducing agent refers to a water-reducing agent that is marketed in a liquid state regardless of the solid component density. When a commercially available high performance water-reducing agent is added in the state of powder, it is not included in the between 15 and 25 mass portions. It is hardly possible to achieve a good fluidity if the ratio of fine aggregate is reduced and the high performance water-reducing agent is added by a mass portion that maximizes the effect of water-reduction when mixing water is less than 15 mass portions, whereas it is not possible to achieve the intended strength when mixing water exceeds 25 mass portions.

High performance water-reducing agents that can be used for a ultra high strength fiber-reinforced cement composition according to the present invention include those that are simply referred to as high performance water-reducing agents and those referred to as high performance AE water-reducing agents. While there are no limitations to the type and the dosage of the high performance water-reducing agent, the high performance water-reducing agent is 5 mass portions at most, preferably 4 mass portions, relative to 100 mass portions of binder regardless of the type of the high performance water-reducing agent. In most cases, it is not possible to raise the effect of water-reduction if the high performance water-reducing agent is added by more than 5 mass portions.

For the purpose of the present invention, a high performance water-reducing agent contains a polyalkylarylsulfonate type high performance water-reducing agent, an aromatic aminosulfonate type high performance water-reducing agent, a melamine formalin resin sulfonate type high performance water-reducing agent or a polycarboxylate type water-reducing agent or two or more than two of them as principal ingredient. Polyalkylarylsulfonate type high performance water-reducing agents include methylnaphthalene sulfonic acid formalin condensates, naphthalene sulfonic acid formalin condensates and anthracene sulfonic acid formalin condensates. They show a high water-reducing effect and a small cementation retarding property without showing any air entraining effect but, on the other hand, are accompanied by a problem of a small flow/slump retaining property. Commercially available typical polyalkylarylsulfonate type high performance water-reducing agents include "FT-500" series (tradename: available from Denki Kagaku Kogyo K. K), "MIGHTY 100 (powder)" and "MIGHTY 150" series (tradename: available from Kao Corporation), "SELFLOW 155" (tradename: available from Dai-ichi Kogyo Seiyaku Co., Ltd.), "POLFINE MF" etc. (tradename: available from Takemoto Oil & Fat Co., Ltd.) and "FLOWRIC PS" (tradename: available from Flowric Co., Ltd.). Commercially available aromatic aminosulfonate type high performance water-reducing agents include "FLOWRIC VP200" (tradename: available from Flowric Co., Ltd.). Commercially available melamine formalin resin sulfonate type high performance water-reducing agents include "DAREX FT-3S" (tradename: available from Grace Chemicals K. K.) and "MOL MASTER F-10 (powder)" and "MOL MASTER F-20 (powder)" (tradenames: available from Showa Denko K. K.).

High performance AE water-reducing agents may include modified polyalkylarylsulfonate type high performance water-reducing agents, modified aromatic aminosulfonate type high performance water-reducing agents and modified melamine formalin resin sulfonate type high performance water-reducing agents, although they may generally refer to polycarboxylate type water-reducing agents. A polycarboxylate type water-reducing agent is a copolymer containing an unsaturated carboxylic acid monomer as ingredient or a salt thereof. Examples of polycarboxylate type water-reducing agents mainly include polyalkylene glycol monoacrylic acid ester, polyalkylene glycol monomethacrylic acid ester, a copolymer of maleic acid anhydrate and styrene, a copolymer of acrylic acid and a methacrylate and copolymers derived from monomers that can be subjected to copolymerization of any of such monomers. High performance AE water-reducing agents show a higher water-reducing effect than a high performance water-reducing agent with a smaller dosage. Generally, high performance AE water-reducing agents show an air entraining effect and a remarkable cementation/setting retarding effect but, on the other hand, they have a good flow/slump retaining property. Commercially available high performance AE water-reducing agents include "RHEOBUILD SP 8 N, 8 HU" series (tradename: available from NMB Co., Ltd.), "FLOWRIC SF500S" series (tradename: available from (Flowric Co., Ltd.), "CHUPOL HP8" and "CHUPOL HP11" series (tradenames: available from Takemoto Oil & Fat Co., Ltd.), "DAREX SUPER 100", "DAREX SUPER 200", "DAREX SUPER 300" and "DAREX SUPER 1000" series (tradenames: available from Grace Chemicals K. K.) and "MIGHTY 3000", "MIGHTY 21WH" and "MIGHTY 21WH" series (tradenames: available from Kao Corporation).

Metal fiber to be used for ultra high strength fiber-reinforced mortar or concrete according to the present invention contains metal filaments having a length of between 5 and 30 mm and a diameter of between 0.1 and 1 mm. It is added by between 0.5 and 3 volume % per 1 $m^3$ of mortar or concrete. The fluidity of mortar or concrete falls when the length exceeds 30 mm to make it no longer possible to expect an improvement to the bending strength. When, on the other hand, the length is less than 5 mm, it is shorter than the maximum size of fine aggregate. Then, the fiber-reinforced effect of mortar or concrete is reduced if subjected to bending stress and the bending strength falls. Preferably, the length of metal filaments is between 10 and 30 mm. When the diameter of metal filaments is less than 0.1 mm, the strength of metal filaments itself is reduced to make it difficult to improve the bending strength. When, on the other hand, the diameter of metal filaments exceeds 1 mm, the number of metal filaments per unit volume of fiber-reinforced mortar or concrete is reduced to make it difficult to improve the bending strength if the ratio of metal fiber is increased.

Metal fiber is added by between 0.5 and 3 volume % per 1 $m^3$ of mortar or concrete. The effect of improving the bending strength is insufficient when the content of metal fiber is less than 0.5 volume %, whereas the bending strength cannot be expected to be improved relative to the content when the content exceeds 3 volume %. Preferably, the content is between 0.7 and 2.5 volume %. Although there are no limitations of the material of metal fiber, steel fiber or stainless steel fiber is a preferable choice because they are easily available.

No specific process is required to mix ultra high strength fiber-reinforced mortar or concrete according to the present invention. In other words, any ordinary mixing process may be used for the purpose of the present invention. When a forced mixer is used, the timing of adding metal fiber is preferably when the mortar or concrete in the mixer starts showing fluidity so that the mortar or concrete may be mixed once again with the added metal fiber.

The process of curing ultra high strength fiber-reinforced mortar or concrete according to the present invention is not subjected to any particular limitations. Any ordinary curing process maybe used for cast-in-place concrete, whereas steam curing, autoclave curing or hot water curing may be used for precast concrete products.

Now, the present invention will be described further by way of examples, although the present invention is by no means limited by the examples.

Firstly, the materials, the test items of the examples and the method thereof are listed below.

[Used Materials]
cement: ordinary Portland cement available from Denki Kagaku Kogyo K. K., density: 3.16 $g/cm^3$.
fine aggregate: river sand from Himekawa River in Niigata Prefecture, smaller than 5 mm, density: 2.62 $g/cm^3$.
SF: silica fume, available from Elkem Japan K. K., density: 2.44 $g/cm^3$.
CGFA: produce of The Netherlands, density: 2.44 g/cc.
gypsum: insoluble anhydrous gypsum, natural product, density: 2.82 $g/cm^3$.
high performance water-reducing agent: polycarboxylate type water-reducing agent, "SUPER 100N" (tradename, available from Grace Chemicals K. K.).
metal fiber A: made of stainless steel, diameter; 0.2 mm, length: 20 mm, tensile strength: 2,000 $N/mm^2$ or more, density: 7.85 $g/cm^3$.
metal fiber B: made of steel, diameter: 0.2 mm, length: 15 mm, tensile strength: 2,000 N/mm², density: 7.80 g/cm³.

metal fiber C: made of steel, diameter: 0.2 mm, lengths: 3, 5, 10, 15, 20, 30 and 40 mm, tensile strength: 1,600 N/mm², density: 7.85 g/cm³.

[Test Items and Test Processes]

mixing of mortar and measurement of flow

A process according to JIS R 5201 was used. For the flow, the flow by self-weight without vibration (mm) measured when pulled up was used.

measurement process of mortar strength

The measurement process according to JIS R 5201 was used for the bending strength. A member molded in a ø5×10 cm cylindrical mold was used for the compressive strength.

A mortar mixer according to JIS R 5201 was used for mixing mortar. A dry mixture of cement, silica fume, CGFA, gypsum and fine aggregate prepared by manually mixing them in a polyethylene bag was put into a mixing bowl and mixed with mixing water dissolving the high performance water-reducing agent at low speed for 5 minutes and then at high speed for 2 minutes. Metal fiber was added bit by bit, agitating the mixture at low speed, after the above 7 minutes mixing of the mortar. After adding all the metal fibers, the mixture was mixed further for 3 minutes. For the curing process, the molded ultra high strength fiber-reinforced mortar specimen was immediately subjected to sealed curing by covering the surface of the mold by means of a vinyl sheet in a thermostatic chamber held to 20° C. and then demolded next day. Then, the specimen was put into a steam curing chamber and the temperature was raised to 80° C. to subject the specimen to steam curing for 24 hours. After the steam curing, the specimen was left to emit heat and become cool before a strength test.

EXAMPLE 1

100 mass portions of fine aggregate and 19 mass portions of water (containing mixing water and the water-reducing agent by 3 mass portions relative to the binder) were added to 100 mass portions of the binder and also metal fiber A was added to a mixing ratio of 0.7 volume %. Then, the mixture was mixed to produce ultra high strength fiber-reinforced mortar, arbitrarily changing the mixing ratios of silica fume and CGFA and the quantity of silica fume and CGFA added to 100 mass portions of the binder and also the mixing ratio of gypsum. Then, specimens were molded, cured and measured for compressive strength and bending strength. Table 1 below summarily shows the obtained results.

TABLE 1

| Experiment | Mixing ratio (mass portion) | | Added quantity | Gypsum | Flow value | Bending | Compressive | Bending/ compressive | |
|---|---|---|---|---|---|---|---|---|---|
| No. | SF | CGFA | (mass portion) | (mass portion) | (mm) | strength | strength | strength ratio | Remarks |
| 1-1 | — | — | — | — | 160 | 16.2 | 138 | 1/8.5 | Comp. Ex. |
| 1-2 | 100 | — | 20 | — | 205 | 17.5 | 169 | 1/9.7 | Comp. Ex. |
| 1-3 | — | 100 | 20 | — | 197 | 16.3 | 145 | 1/8.9 | Comp. Ex. |
| 1-4 | 70 | 30 | 20 | — | 214 | 18.3 | 160 | 1/8.7 | Comp. Ex. |
| 1-5 | — | — | — | 4 | 165 | 15.0 | 156 | 1/10.4 | Comp. Ex. |
| 1-6 | 100 | — | 20 | 4 | 210 | 16.6 | 186 | 1/11.2 | Comp. Ex. |
| 1-7 | — | 100 | 20 | 4 | 201 | 18.0 | 162 | 1/9.0 | Comp. Ex. |
| 1-8 | 97 | 3 | 20 | 4 | 212 | 18.7 | 182 | 1/9.7 | Comp. Ex. |
| 1-9 | 95 | 5 | 20 | 4 | 219 | 21.4 | 180 | 1/8.4 | Present Ex. |
| 1-10 | 90 | 10 | 20 | 4 | 230 | 26.8 | 179 | 1/6.7 | Present Ex. |
| 1-11 | 80 | 20 | 20 | 4 | 232 | 28.6 | 178 | 1/6.2 | Present Ex. |
| 1-12 | 70 | 30 | 20 | 4 | 243 | 30.3 | 175 | 1/5.8 | Present Ex. |
| 1-13 | 60 | 40 | 20 | 4 | 231 | 27.1 | 162 | 1/6.0 | Present Ex. |
| 1-14 | 50 | 50 | 20 | 4 | 220 | 21.1 | 156 | 1/7.4 | Present Ex. |
| 1-15 | 40 | 60 | 20 | 4 | 203 | 17.3 | 133 | 1/7.7 | Comp. Ex. |
| 1-16 | 70 | 30 | 20 | 0.5 | 221 | 20.5 | 165 | 1/8.0 | Present Ex. |
| 1-17 | 70 | 30 | 20 | 1 | 235 | 22.3 | 172 | 1/7.7 | Present Ex. |
| 1-18 | 70 | 30 | 20 | 2 | 240 | 25.8 | 180 | 1/7.0 | Present Ex. |
| 1-19 | 70 | 30 | 20 | 3 | 242 | 28.2 | 181 | 1/6.4 | Present Ex. |
| 1-20 | 70 | 30 | 20 | 5 | 244 | 29.5 | 192 | 1/6.5 | Present Ex. |
| 1-21 | 70 | 30 | 20 | 6 | 231 | 28.3 | 189 | 1/6.7 | Present Ex. |
| 1-22 | 70 | 30 | 20 | 8 | 216 | 27.6 | 187 | 1/6.8 | Present Ex. |
| 1-23 | 70 | 30 | 5 | 4 | 172 | 20.2 | 152 | 1/7.5 | Present Ex. |
| 1-24 | 70 | 30 | 7 | 4 | 193 | 22.1 | 160 | 1/7.3 | Present Ex. |
| 1-25 | 70 | 30 | 10 | 4 | 210 | 24.0 | 169 | 1/7.0 | Present Ex. |
| 1-26 | 70 | 30 | 25 | 4 | 237 | 28.6 | 171 | 1/6.0 | Present Ex. |
| 1-27 | 70 | 30 | 30 | 4 | 220 | 29.0 | 162 | 1/5.6 | Present Ex. |
| 1-28 | 70 | 30 | 40 | 4 | 206 | 26.3 | 158 | 1/6.0 | Present Ex. |

(Note 1):
Figures for silica fume, CGFA and gypsum are mixing ratios (mass portions) relative to 100 mass portions of cement.

(Note 2):
The unit of bending strength and compressive strength is N/mm².

As shown in Table 1, the comparative specimens of Experiments Nos. 1-2 through 1-7 where silica fume and/or CGFA were added with or without gypsum for Comparative Examples show a compressive strength greater than the plane specimen of Experiment No. 1-1 but the bending strength thereof does not exceed 20 N/mm². Additionally, the ratio of the bending strength to the compressive strength of any of those specimens is similar to or lower than that of the plain specimen.

In Experiments Nos. 1-8 through 1-15, mixing ratio of gypsum and the total mixing ratio of silica fume and CGFA were held to a constant value and only the mixing ratio of silica fume relative to CGFA was changed. As the mixing ratio of CGFA increases, the compressive strength gradually falls but conversely the bending strength rises to get to a peak level before it falls thereafter. More specifically, the bending strength is less than 20 N/mm² when the ratio of silica fume to CGPA is less than 95:5 (Experiment 1-8: Comparative Example) but the bending strength goes above 20 N/mm² when the ratio is 95:5 (Experiment No. 1-9) and becomes maximized when the ratio is 70:30 (Experiment No. 1-12). However, the compressive strength falls below 150 N/mm² and the bending strength becomes lower than 20 N/mm² (Experiment No. 1-15: Comparative Example) when the mixing ratio of CGFA exceeds 50: 50 (Experiment 1-14). From above, the mixing ratio (mass ratio) of silica fume and CGFA should be 95 through 50:5 through 50. Preferably, the mixing ratio (mass ratio) of silica fume and CGFA is 90 through 60:10 through 40.

Experiments Nos. 1-16 through 1-22, where different mixing ratios were used for gypsum, proved that the added gypsum was effective when the mixing ratio of gypsum is between 0.5 and 8 mass portions relative to 100 portions of the binder. The effect of gypsum becomes remarkable from 1 mass portion (Experiment No. 1-17) but does not improve the strengths significantly if added by 5 mass portions (Experiment No. 1-20) or more. Thus, the preferable range is between 1 and 5 mass portions.

In Experiments Nos. 1-23 through 1-28, where the mixing ratio of silica fume and CGFA and the mixing ratio of gypsum relative to 100 mass portions of the binder were maintained to respective constant levels and only different quantities of silica fume and CGFA were added to 100 mass portions of the binder, showed a compressive strength and a bending strength respectively not less than 150 N/mm² and not less than 20 N/mm² and the strengths became higher when the quantity is increased, although the strengths falls when the quantity became too much because the quantity of cement was reduced relatively as a result. Thus, the total mixing ratio of silica fume and CGFA is between 5 and 40 mass portions, preferably between 7 and 30 mass portions.

EXAMPLE 2

Binders, each of which was prepared by adding 15 mass portions of a mixture of silica fume and CGFA with a mixing ratio of silica fume: CGFA=70:30 and 3 mass portions of gypsum to 100 mass portions of cement, were subjected to experiments as in Example 1 with different ratios of fine aggregate, different water to binder ratios and different mixing ratios of metal fiber B. Table 2 below summarily shows the obtained results. An arbitrarily selected ratio of the high performance water-reducing agent is added so as to make a flow value 200±5 mm that allows the compression to be poured and molded.

TABLE 2

| Experiment No. | Fine aggregate (mass portion) | Metal fiber B (volume %) | *Water (mass portion) | Bending strength (N/mm²) | Compressive strength (N/mm²) | Bending/ compressive strength ratio | Remarks |
|---|---|---|---|---|---|---|---|
| 2-1 | 50 | 0.5 | 15.0 | 22.0 | 178 | 1/8.1 | Present Ex. |
| 2-2 | 60 | 1.0 | 16.0 | 28.7 | 197 | 1/6.9 | Present Ex. |
| 2-3 | 70 | 1.5 | 17.0 | 38.4 | 217 | 1/5.7 | Present Ex. |
| 2-4 | 80 | 0.5 | 18.0 | 28.1 | 202 | 1/7.2 | Present Ex. |
| 2-5 | | 1.0 | | 33.6 | 218 | 1/6.5 | Present Ex. |
| 2-6 | | 1.5 | | 40.4 | 221 | 1/5.5 | Present Ex. |
| 2-7 | | 2.0 | | 43.4 | 225 | 1/5.1 | Present Ex. |
| 2-8 | | 2.5 | | 45.2 | 238 | 1/5.3 | Present Ex. |
| 2-9 | | 3.0 | | 46.7 | 229 | 1/4.9 | Present Ex. |
| 2-10 | | 3.5 | | 45.1 | 226 | 1/5.0 | Present Ex. |
| 2-11 | 120 | 2.0 | 20.0 | 38.6 | 203 | 1/5.3 | Present Ex. |
| 2-12 | 150 | 2.0 | 21.0 | 36.3 | 196 | 1/5.4 | Present Ex. |
| 2-13 | 180 | 2.0 | 23.0 | 31.6 | 177 | 1/5.6 | Present Ex. |
| 2-14 | 200 | 2.0 | 25.0 | 28.8 | 159 | 1/5.5 | Present Ex. |
| 2-15 | 200 | 0.5 | 25.0 | 21.0 | 155 | 1/7.3 | Present Ex. |

(Note 1):
*Water contains the water-reducing agent.
(Note 2):
The figures of the fine aggregate and water are mixing ratios (mass portions) relative to 100 mass portions of the binder containing silica fume + CGFA + gypsum + cement As seen from Table 2, when the mixing ratio was selected to maximize the effect of the high performance water-reducing agent and the relative quantity of fine aggregate was reduced to 50 mass portions, the quantity of water needs to be 15 mass portions in order to achieve the flow value that allows the compression to be poured and molded. It is possible to achieve a bending strength of not less than 20 N/mm² when the content of metal fiber B is reduced to 0.5 volume % (Experiment No. 2-1).

As the mixing ratio of fine aggregate is increased, the quantity of water to be added increases but the compressive strength is also improved because the fragility is improved to get to a peak value before it falls thereafter. Thus, the quantity of fine aggregate to be added to 100 mass portions of the binder is between 50 and 200 mass portions, preferably between 60 and 150 mass portions (Experiments No. 2-1 through 2-14) from the viewpoint of compressive strength. Note that the bending strength exceeds 20 N/mm² and the compressive strength exceeds 150 N/mm² when the quantity of fine aggregate is 200 mass portions and that of water is 25 mass portions, while metal fiber B is added by 0.5 volume % (Experiment No. 2-15).

While the bending strength largely depends on the content of metal fiber B, it is not increased when the content of metal fiber B exceeds 3.5 volume % (Experiment No. 2-10).

EXAMPLE 3

Binders, each of which was prepared by adding 13 mass portions of a mixture of silica fume and CGFA with a mixing ratio of silica fume: CGFA=60:40 and 3 mass portions of gypsum to 100 mass portions of cement, were subjected to experiments as in Example 1 with 70 mass portions of fine aggregate, 16 mass portions of water added to 100 mass portions of the binder and different lengths and mixing ratios of metal fiber C. Table 3 below summarily shows the obtained results. Note that the high performance water-reducing agent was added to the binder by 3.0% of the mass of the binder.

fluidity rapidly falls to make it difficult to mold the composition when the fiber length exceeds 30 mm (Experiment No. 3-9).

INDUSTRIAL APPLICABILITY

It is possible to utilize an ultra high strength fiber-reinforced cement composition and ultra high strength fiber-reinforced mortar or concrete to produce structural members for bridges, annexes to bridges, underground structural members, dam structural members, ocean structural members, building structural members, building members, and civil engineering materials, exploiting the ultra high strength and the high tenacity thereof.

The invention claimed is:

1. An ultra high strength fiber-reinforced cement composition, comprising:
   cement,
   silica fume,
   coal gasification fly ash, said coal gasification fly ash being spherical fine particles having a maximum particle size between 5 and 10 μm,
   insoluble anhydrous gypsum, and
   metal fiber having a length between 5 and 30 mm and a diameter between 0.1 and 1 mm, wherein mass ratio of the silica fume: the coal gasification fly ash is 95 through 50 portions:5 through 50 portions.

2. The ultra high strength fiber-reinforced cement composition according to claim 1, wherein the composition contains the silica fume and the coal gasification fly ash by a total of between 5 and 40 mass portions and the insoluble anhydrous gypsum by between 0.5 and 8 mass portions relative to 100 mass portions of cement.

3. Ultra high strength fiber-reinforced mortar or concrete, comprising:
   cement,
   silica fume,
   coal gasification fly ash, said coal gasification fly ash being spherical fine particles having a maximum particle size between 5 and 10 μm,

TABLE 3

| Experiment No. | Metal fiber C Length (ram) | Metal fiber C (volume %) | Flow value (mm) | Bending strength (N/mm²) | Compressive strength (N/mm²) | Bending/compressive strength ratio | Remarks |
|---|---|---|---|---|---|---|---|
| 3-1 | 3 | 1.5 | 305 | 19.0 | 188 | 1/9.9 | Comp. Example |
| 3-2 | 5 | | 295 | 22.5 | 183 | 1/8.1 | Present Example |
| 3-3 | 10 | | 270 | 31.7 | 185 | 1/5.8 | Present Example |
| 3-4 | 15 | | 231 | 37.6 | 183 | 1/4.9 | Present Example |
| 3-5 | 20 | | 228 | 43.4 | 190 | 1/4.4 | Present Example |
| 3-6 | 15 | 1.0 | 279 | 31.7 | 186 | 1/5.9 | Present Example |
| 3-7 | 20 | | 260 | 36.7 | 191 | 1/5.2 | Present Example |
| 3-8 | 30 | | 203 | 38.7 | 188 | 1/4.9 | Present Example |
| 3-9 | 40 | | *125 | 20.6 | 190 | 1/9.2 | Comp. Example |

(Note 1):
*Hardly moldable because of too poor fluidity. The molded test piece showed a large number of remaining voids.

As seen from Table 3, it is possible to achieve a high bending strength, while maintaining a good fluidity, when the fiber length is between 5 and 30 mm. The effect of improving the bending strength is insufficient when the fiber length is less than 5 mm (Experiment No. 3-1). On the other hand, the insoluble anhydrous gypsum,
fine aggregate, and
metal fiber having a length between 5 and 30 mm and a diameter between 0.1 and 1 mm, wherein mass ratio of silica fume: coal gasification fly ash is 95 through 50 portions:5 through 50 portions.

4. The ultra high strength fiber-reinforced mortar or concrete according to claim 3, wherein the mortar or concrete contains the silica fume and the coal gasification fly ash by a total of between 5 and 40 mass portions and the insoluble anhydrous gypsum by between 0.5 and 8 mass portions relative to 100 mass portions of cement.

5. The ultra high strength fiber-reinforced mortar or concrete according to claim 3, wherein the mortar or concrete contains the fine aggregate by between 50 and 200 mass portions, mixing water and a high performance water-reducing agent by a total of between 15 and 25 mass portions relative to a total of 100 portions of the cement, the silica fume, the coal gasification fly ash and the insoluble anhydrous gypsum and contains the metal fiber by between 0.5 and 3 volume % per 1 $m^3$ of the mortar or concrete.

6. The ultra high strength fiber-reinforced mortar or concrete according to claim 3, wherein the mortar or concrete has a compressive strength not less than 150 $N/mm^2$ and a bending strength not less than 20 $N/mm^2$.

7. The ultra high strength fiber-reinforced mortar or concrete according claim 5, wherein the mortar or concrete has a compressive strength not less than 150 $N/mm^2$ and a bending strength not less than 20 $N/mm^2$.

8. An ultra high strength cement additives, comprising:
silica fume,
coal gasification fly ash, said coal gasification fly ash being spherical fine particles having a maximum particle size between 5 and 10 μm, and
insoluble anhydrous gypsum as principal ingredients, wherein mass ratio of the silica fume: the coal gasification fly ash is 95 through 50 portions:5 through 50 portions.

9. The ultra high strength cement additives according to claim 8, wherein the additives uses the silica fume and the coal gasification fly ash by a ratio of a total of between 5 and 40 mass portions and the insoluble anhydrous gypsum by a ratio of between 0.5 and 8 mass portions relative to 100 mass portions of cement.

* * * * *